Feb. 2, 1965  A. M. COOK ETAL  3,168,298
TUNNEL KILN AND METHOD OF OPERATION
Filed July 3, 1961  3 Sheets-Sheet 1

INVENTORS.
ARNOLD M. COOK
DAVID L. MAHONEY
BY
Allan R. Redrow
ATTORNEY

INVENTORS.
ARNOLD M. COOK
DAVID L. MAHONEY

Feb. 2, 1965  A. M. COOK ETAL  3,168,298
TUNNEL KILN AND METHOD OF OPERATION
Filed July 3, 1961  3 Sheets-Sheet 3

INVENTORS.
ARNOLD M. COOK
DAVID L. MAHONEY
BY
Allan R. Redrow
ATTORNEY

Patent text page …

United States Patent Office 3,168,298
Patented Feb. 2, 1965

3,168,298
TUNNEL KILN AND METHOD OF OPERATION
Arnold M. Cook, Holden, and David L. Mahoney, West Boylston, Mass., assignors to Norton Company, Worcester, Mass., a corporation of Massachusetts
Filed July 3, 1961, Ser. No. 123,361
17 Claims. (Cl. 263—28)

This invention relates to tunnel kilns for use in firing silicon carbide refractories and the like, and has for its principal objects to provide a kiln with heat-treating zones at different temperatures and atmospheres, with provision for widely varying the temperatures and atmospheres therein; to provide for raising the temperature from one zone to the other rapidly while maintaining the temperature substantially uniform and without dilution of the atmosphere of one with that of the other; to provide for direct heating of the interior of the zone of higher temperature wherein the ware has reached a stage such as not to be adversely affected by the presence of the products of combustion and indirectly heating the zone of lower temperature to avoid the presence of products of combustion therein at the stage where the ware would be adversely affected, and to permit maintenance of an oxidizing atmosphere therein without resort to the expense of excess air burners which use up large quantities of fuel; to provide for replacement of oxygen in the latter zone lost by evacuation, diffusion and oxidation; to control the oxidizing atmosphere closely; and to provide for efficient use of the fuel.

As herein illustrated, the foregoing is accomplished by providing, within the kiln, adjacent heat-treating zones and an intermediate zone, maintaining the heat-treating zones at different temperatures and providing means for inducing flow of the atmosphere within the heat-treating zones into the intermediate zone to effect a mixture thereof with the atmosphere in the intermediate zone and to thereafter exhaust the mixed atmosphere from the kiln. The zone of higher temperature is heated directly by injecting hot gaseous products of combustion of a combustible fuel into the interior thereof and the zone of lower temperature is heated indirectly by conducting the hot gaseous products of combustion externally thereof to heat the walls and, by radiation and muffle convection, the interior. Air is supplied to the interior of the zone of lower temperature to make up for the loss drawn off at the intermediate zone and also for diffusion and oxidation. The zone of higher temperature is lined with a checkerwork of refractory brick and the hot gaseous products of combustion are generated by burners arranged externally thereof which project the products of combustion through the checkerwork into the interior of the zone. The zone of lower temperature is lined with a muffle containing a chamber through which the mixed atmospheres exhausted from the intermediate zone are circulated for heating the muffle and hence the interior of the zone. The means for producing the lower pressure at the intermediate zone and for exhausting the mixed atmospheres is an exhaust pump having an intake side connected to the intermediate zone and a discharge side connected to the muffle chambers.

At the remote end of the zone of lower temperature there is a checkerwork lining of refractory brick providing passages through which the mixed gases are returned to the interior of the kiln for preheating ware entering the kiln and there is an exhaust pump for drawing off the spent gases together with some of the oxidizing atmosphere from the zone of lower temperature through openings in the wall of the kiln adjacent the entrance end. At the far side of the high temperature zone there are openings through the wall of the kiln, through which air is supplied for entrance directly to the interior thereof for contact with the ware to cool it and also muffle chambers in the walls of the kiln through which air is supplied for cooling the walls and crown in this zone.

The invention will now be described in greater detail with reference to the accompanying drawings wherein.

Figure 1:
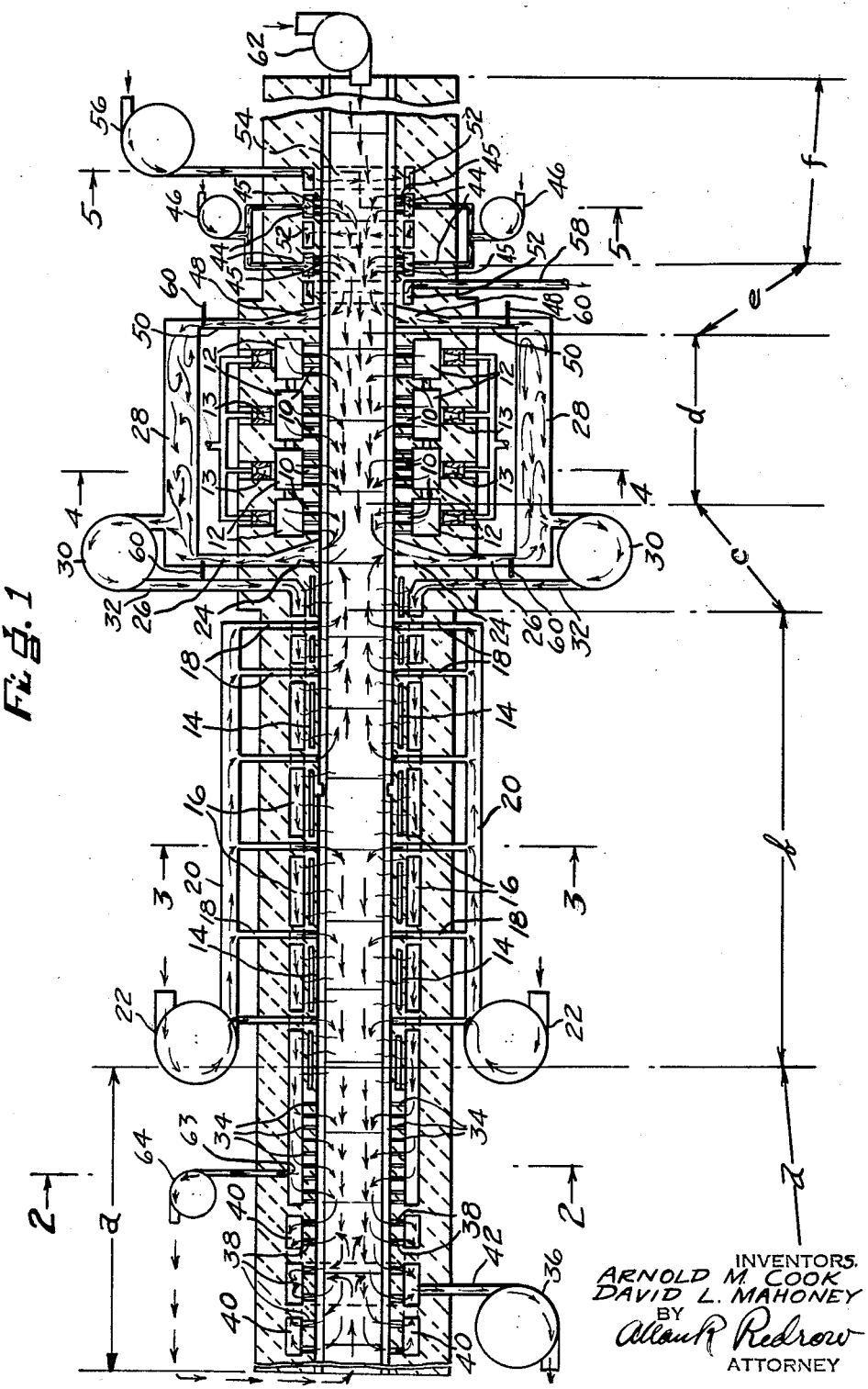
FIG. 1 is a horizontal section of the kiln constructed according to this invention, with arrows showing the direction of flow of the atmospheres in the several zones.
Figure 2:
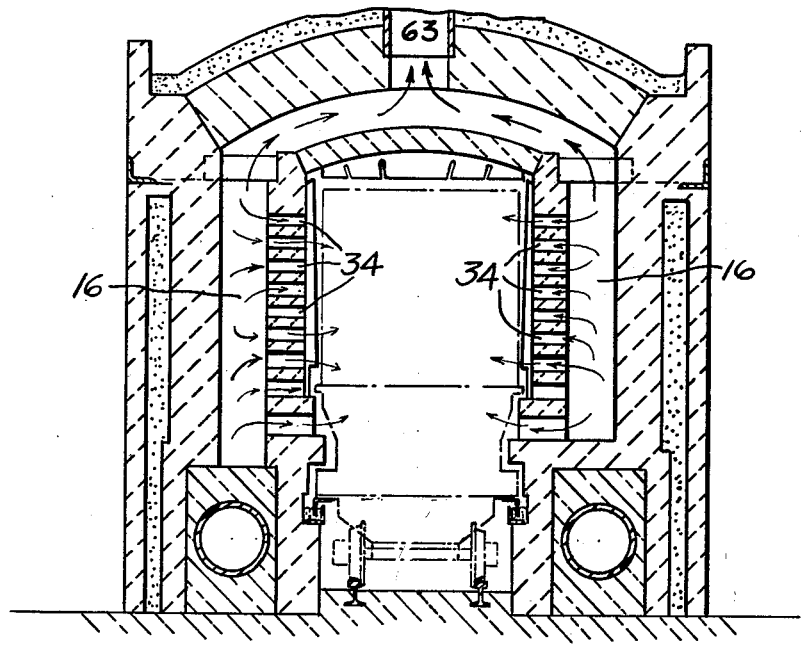
FIG. 2 is a vertical section taken transversely of the kiln in the preheating zone on a line 2—2 of FIG. 1.
Figure 3:
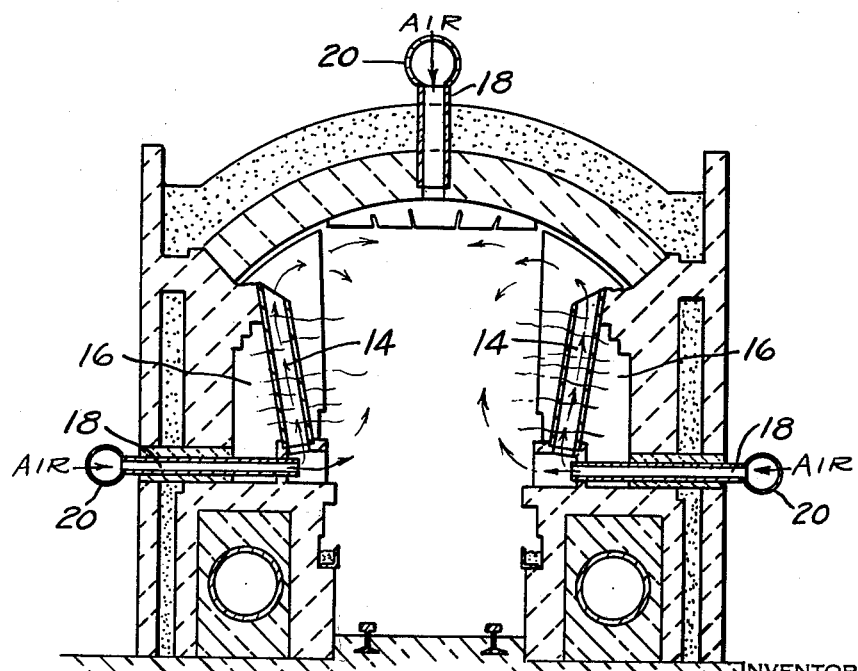
FIG. 3 is a vertical section taken transversely of the kiln through the low temperature heat-treating zone on a line 3—3 of FIG. 1.
Figure 4:
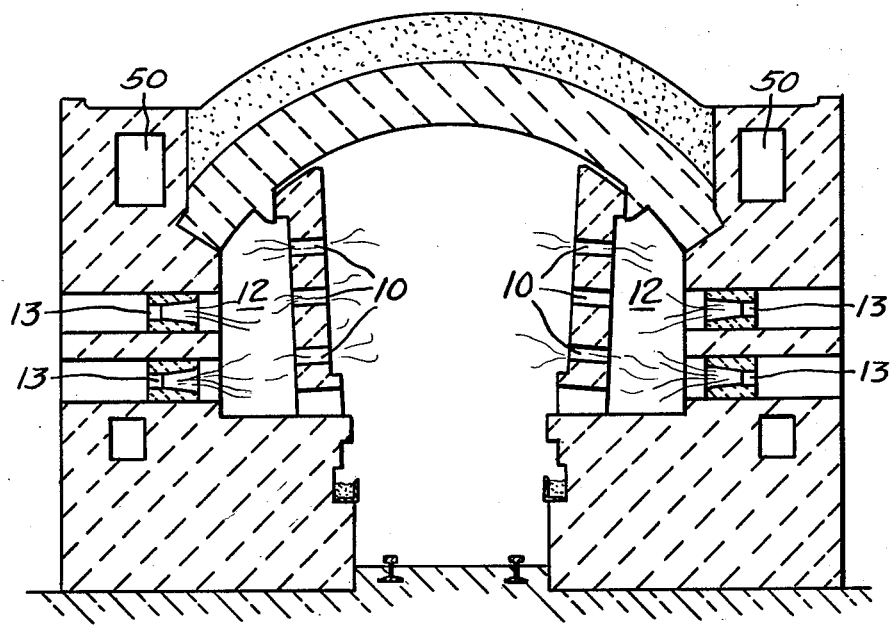
FIG. 4 is a vertical section taken transversely of the kiln at the high temperature heat-treating zone, taken on the line 4—4 of FIG. 1.
Figure 5:
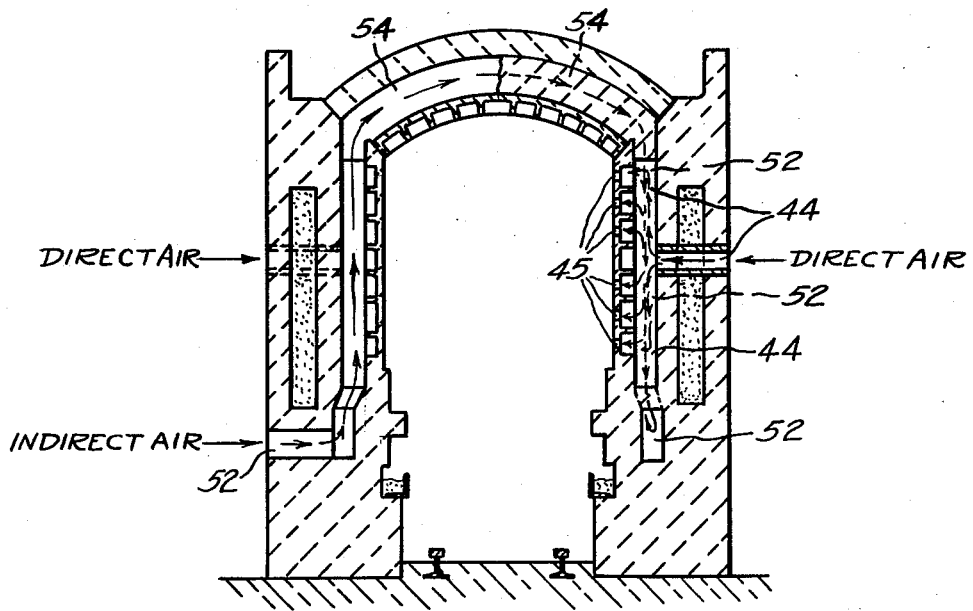
FIG. 5 is a vertical section taken transversely of the kiln in the rapid cooling zone, taken on the line 5—5 of FIG. 1.

Referring to the drawings, the kiln is of the type commonly known as a "continuous" or "tunnel" kiln which is constructed of refractory material having side walls, an arched top or crown and a floor along which there are tracks upon which flatcars are supported for movement through the kiln from the entrance end at the left to the exit end at the right. The kiln has, from left to right, a preheating zone $a$, a first heat-treating zone $b$, a rapid heating zone $c$, a second heat-treating zone $d$, a rapid cooling zone $e$ and a slow cooling zone $f$. The first and second heat-treating zones $b$ and $d$ are maintained at different temperatures and at different atmospheres and the temperature is raised from one to the other at a very rapid rate in the zone $c$. To this end the walls of the kiln at the zone $d$ are provided with a checkerwork lining 10 of refractory brick, externally of which there are chambers 12 in which a mixture of fuel and air is burned. The fuel, air mixture is injected into the combustion chamber 12 by a series of burners 13 and the products of combustion pass through the checkerwork directly into the interior of the zone $d$ where they contact the ware which is being heat-treated, resting on any cars which are situated in this zone. The air supplied to the burners may be pre-heated as will appear hereinafter.

The zone of lower temperature or first heat treat zone $b$, has a muffle lining 14 which is substantially impervious and which is spaced from the walls of the kiln so as to provide heat-conductive chambers 16 externally of the lining, which are coextensive with the wall of the zone $b$. Additionally, there are nozzles 18 extending through the walls and crown, the heat-conductive chambers and the muffle lining to the interior of the zone $b$ and conductors 20 connecting the nozzles to a source for supplying controlled amounts of air to the interior of the zone $b$. A pump in the form of a force draft blower fan 22 may be provided for this purpose.

At the intermediate rapid heating zone $c$ there are ports 24 through the walls which are connected by conductors 26 to mixing chambers 28. The mixing chambers 28, are, in turn, connected to the intake sides of pumps in the form of force draft fans 30. The discharge sides of the fans 30 are connected by conductors 32 to the muffle chambers 16. As thus constructed, when the fans 30 are operated a low pressure is developed in the intermediate zone $c$ which induces the hot products of combustion to flow from the zone $d$ of higher temperature and the air to flow from the zone $b$ of lower temperature into the intermediate zone $c$, where they mix so that the temperature in the zone $c$ rises rapidly from that of the zone $b$ to the higher temperature of zone $d$. The mixed gases forming the atmosphere of the intermediate zone are drawn off through the conductors 26 into the mixing chambers 28 by the fans 30 and delivered therefrom through the conductors 32 to the muffle chambers to heat the muffle walls lining the zone $b$ of lower temperature and hence the interior of the zone by radiation and muffle convention. Thus, heating of the zone of lower temperature is effected without contamination of its atmosphere with the products of combustion so that a substantially completely oxidizing atmosphere can be maintained therein by supplying air in controlled quantities through the nozzles 18.

The high and low temperature zones may thus be operated at maximum efficiency both from the standpoint of fuel combustion and firing of the ware since the atmosphere of the high temperature zone can be maintained favorable to efficient combustion of the fuel and the atmosphere of the low temperature can be maintained favorable to optimum oxidation of the ware. The flow of the atmospheres from the two heat-treating zones into the intermediate zone operates not only to produce a rapid rise in temperature between them but also to prevent contamination of one zone with the atmosphere of the other and vice versa.

The walls of the preheating zone $a$, adjacent the inlet end of the zone $b$, are, in turn, lined with a checkerwork of refractory brick providing a plurality of openings 34 leading from the muffle chamber 16, a portion of which extends into the interior of that zone, through which the mixed gases delivered to the muffle chamber are forced by the fans 30 back into the kiln under controlled high velocity to insure uniform preheating of the ware in zone $a$. After entering the zone $a$ the gaseous products of combustion together with some of the oxidizing atmosphere of the low temperature zone are drawn toward the entrance end of the kiln by a pump in the form of an exhaust fan 36 which thus prevents contamination of the heat-treating zone of lower temperature with the products of combustion re-entering the kiln at the preheating zone. The mixed gases in this zone do not injuriously affect the ware because of the relatively low temperatures existing therein.

The mixed atmospheres are finally withdrawn from the kiln near the entrance end through ports 38 extending from the interior of the kiln through its walls into chambers 40 within the walls, the latter being connected by ports 42 to the intake side of the exhaust fan 36. A contra-convection circulation system further insures uniform preheating in zone $a$, by removing hot gases from port 63 by means of an exhaust pump 64 which then circulates the heated gases external of aforementioned zone and injects said gases into zone $a$ adjacent to kiln entrance.

Rapid cooling, which is desirable to obtain optimum quality in the ware, is achieved by providing chamber 44 and ports 45 through the walls of the kiln in the zone $e$ through which air may be delivered by pumps in the form of force draft fans 46 directly to the interior of this zone, for contact with the hot ware. To prevent any excessive amount of this air from entering the zone $d$ of high temperature which might interfere with efficient combustion, there are ports 48 situated between the adjacent ends of the zones $d$ and $e$ which are connected by conductors 50 to the mixing chambers 28 so that some of the air supplied to the interior of the zone $e$ is by-passed and mixed with the atmospheres drawn from the intermediate zone $c$. This reduces dilution of the high temperature zone and/or contamination of the rapid cooling zone. To further effect cooling in the zone $e$ the walls of the kiln are provided with chambers 52 connected by passages 54 in the crown to which air is supplied by a pump in the form of a force draft fan 56 and from which air is discharged through a conductor 58. The warm air discharged through the conductor 58 may be employed as preheated air for the burners 13.

Dampers 60 are provided in the conductors 26 and 50 to control the flow of the atmospheres from the zones $c$ and $e$ into the mixing chambers and hence the temperature of the mixture delivered to the muffle chamber in the zone $b$.

Slow cooling is effected in the zone $f$ which extends from the zone $e$ to the exit end of the kiln. Preferably air is delivered into the exit end by a pump in the form of a force draft fan 62 to maintain a slight flow inwardly toward the cooling zone.

As thus constructed, it has been found possible to maintain a substantially uniform heat-treating temperature throughout the zone $b$ and a higher heat-treating temperature throughout the zone $d$ with a temperature gradient in the zone $c$ between $b$ and $d$. The final stages may be controlled as desired to provide rapid cooling or any specific cycle of cooling.

The foregoing conditions are for the purpose of illustration and may be varied widely according to the character of the operation and the material being treated. Flow is, of course, effected by controlling the rate of flow of the atmospheres in the several zones, the proportions of fuel and the proportions of oxygen. At the conditions given and depending upon the products being treated a variable oxygen content can be produced.

It should be understood that the present disclosure is for the purpose of illustration only and that this invention includes all modifications and equivalents falling within the scope of the appended claims.

We claim:

1. A tunnel kiln having a wall structure defining a tunnel with adjacent lengths of said tunnel forming a soaking zone and a heat-treating zone, means for indirectly heating said soaking zone comprising muffle means substantially impervious to said soaking zone and spacedly removed from the walls of said kiln to provide heat conductive chambers, means for heating said heat-treating zone, said zones maintained at different temperatures, means for effecting a rapid rise in temperature from said soaking zone to the heat treating zone, said means comprising an intermediate zone situated at the adjacent ends of said zones, said intermediate zone being adapted to be maintained at a lower pressure than said adjacent zones, said intermediate zone having inlet means into which the atmospheres of the adjacent zones flow and mix, and means for exhausting the mixes atmospheres from the intermediate zone at said lower pressure to said heat conductive chambers.

2. In a tunnel kiln, a wall structure defining a tunnel with adjacent lengths of said tunnel forming a soaking zone and a heat treating zone, means for indirectly heating said soaking zone comprising muffle means substantially impervious to said soaking zone and spacedly removed from the walls of said kiln to provide heat conductive chambers, means for maintaining said soaking and heat treating zones at different temperatures with a sharp rise of temperature from said soaking zone to said heat treating zone comprising means for heating the heat treating zone by supplying hot gaseous products of combustion to the interior thereof, an intermediate zone situated between the adjacent ends of said soaking and heat treating zones and means at said intermediate zone for inducing the atmospheres of the adjacent soaking and heat treating zones to flow together at said intermediate zone and for exhausting the mixed atmospheres from the intermediate zone at said lower pressure to said heat conductive chambers to heat the interior of the soaking zone by radiation and muffle convection.

3. In a tunnel kiln, a wall structure defining a tunnel with adjacent lengths of said tunnel forming a soaking zone and a heat treating zone and means for maintaining them at different soaking and heat treating temperatures with a sharp rise in temperature therebetween, comprising means for indirectly heating said soaking zone comprising muffle means substantially impervious to said soaking zone and spacedly removed from the walls of said kiln to provide heat conductive chambers, means for maintaining an atmosphere of hot products of combustion within the heat treating zone, means for maintaining an oxidizing atmosphere in the soaking zone, and means for inducing the flow of the atmospheres of the soaking and heat treating zones together at their adjacent ends to effect mixing thereof, said inducing means delivering the mixed atmospheres to the exterior of the tunnel wall defining the soaking zone to heat the interior thereof by radiation and muffle convection.

4. In a tunnel kiln, a wall structure defining a tunnel with adjacent lengths of said tunnel forming a soaking zone and a heat treating zone and means for maintaining said zones at different soaking and heat treating temperatures with a sharp rise in temperature therebetween, comprising means for indirectly heating said soaking zone comprising muffle means substantially impervious to said soaking zone and spacedly removed from the walls of said kiln to provide heat conductive chambers, burners for supplying hot products of combustion to the interior of said heat treating zone, nozzles through which air is supplied to the interior of said soaking zone, an intermediate zone situated between the adjacent ends of said soaking and heat treating zones, and means for inducing the atmospheres of the soaking and heat treating zones to flow together at said intermediate zone, said inducing means exhausting the mixed atmospheres from the kiln and delivering the mixture in heat conductive relation to the exterior of said tunnel wall of said soaking zone to heat the interior thereof by radiation and muffle convection.

5. In a tunnel kiln, a wall structure defining a tunnel with adjacent lengths of said tunnel forming a soaking zone and a heat treating zone and means for establishing substantially uniform but different soaking and heat treating temperatures within the said zones with a sharp rise in temperature from said soaking zone to said heat treating zone, comprising means for indirectly heating said soaking zone comprising muffle means substantially impervious to said soaking zone and spacedly removed from the walls of said kiln to provide heat conductive chambers, burners for supplying heat directly to the interior of the heat treating zone, nozzles for supplying air to the interior of said soaking zone, and means for inducing the atmospheres of said soaking and heat treating zones to mix at the adjacent ends of said zones, said inducing means exhausting the mixture from the kiln and conducting it to said heat conductive chambers to heat the latter so that it, in turn, heats the interior of said soaking zone by radiation and muffle convection.

6. In a tunnel kiln, a wall structure comprising a tunnel with two hot zones of different lengths and temperatures therein, comprising a soaking zone and a heat treating zone, an intermediate zone between said soaking and heat treating zones for raising the temperature from said soaking temperature to said heat treating temperature at a very rapid rate, means for indirectly heating said soaking zone comprising muffle means substantially impervious to said soaking zone and spacedly removed from the walls of said kiln to provide heat conductive chambers, gas combustion means for heating said heat treating zone, means for supplying air to said soaking zone and means for mixing the products of combustion supplied to the zone of higher temperature, for heating the interior thereof, with the air supplied to the zone of lower temperature, to provide an oxidizing atmosphere therein, in the intermediate zone, and draft-inducing means in communication with the intermediate zone for inducing the products of combustion and air from the respective heat treating and soaking zones to mix in the intermediate zone, said draft-inducing means operating to exhaust the mixed atmospheres from the kiln and to deliver the mixture to said heat conductive chambers for heating the interior of said zone of lower temperature by radiation and muffle convection.

7. In a tunnel kiln, a wall structure defining a tunnel with adjacent lengths of tunnel forming two hot zones, comprising a soaking zone for soaking ware and a heat treating zone for heat treating said ware, said zones maintained at different temperatures, means for indirectly heating said soaking zone comprising muffle means substantially impervious to said soaking zone and spacedly removed from the walls of said kiln to provide heat conductive chambers, an intermediate zone for raising the temperature from the lower soaking temperature to the higher heat treating temperature rapidly, burners for effecting combustion of fuel and air directly within the hot zone of higher heat treating temperature, means for delivering controlled quantities of air to the interior of the hot zone of lower soaking temperature, and a pump outside the tunnel wall situated at the intermediate zone, said pump having an inlet side connected to the interior of the intermediate zone, and a discharge side connected to the muffle means, said pump inducing the products of combustion and the air within the high heat treating and low soaking temperature hot zones to mix at said intermediate zone and delivering the mixture to said muffle means.

8. In a tunnel kiln, a wall structure defining a tunnel with adjacent lengths of the tunnel forming a first and second hot zone, said first zone provided for soaking ware, said second zone provided for heat treating said ware, said first and second hot zones maintained at different temperatures, means for indirectly heating said first zone comprising muffle means substantially impervious to said first zone and spacedly removed from the walls of the kiln to provide heat conductive chambers, and an intermediate zone for raising the temperature from said first zone to said second zone at a rapid rate, an exhaust fan situated outside the tunnel wall at the intermediate zone, said fan having an inlet and exhaust side with its inlet side in communication with the interior of the intermediate zone, said exhaust fan inducing flow of the atmospheres within the first and second zones toward each other to produce mixing at the intermediate zone, burners for effecting combustion of an air, fuel mixture within said second hot zone, means for supplying air to said first hot zone, and means connecting the exhaust side of said fan to said muffle means to conduct the mixed atmospheres from the intermediate zone into said muffle means to heat the interior of said first hot zone by radiation and muffle convection.

9. The method of maintaining the temperature and atmosphere of a zone within a kiln substantially constant throughout, comprising creating a continuous flow of the atmosphere from within the zone toward its ends and, while removing the atmospheres at the ends, re-supplying a like atmosphere to the zone intermediate its ends and simultaneously heating the atmosphere in the zone.

10. In a tunnel kiln, a wall structure defining a tunnel with adjacent lengths of the tunnel forming two hot zones for soaking at different temperatures, and an intermediate zone for raising the temperature rapidly from the hot zone of lower temperature to the hot zone of higher temperature and for maintaining the atmospheres in the hot zones substantially uniform, an inner refractory wall lining the hot zone of higher temperature, said inner wall being comprised of a checkerwork of refractory brick, burners situated exteriorly of the checkerwork for effecting combustion of an air, fuel mixture and discharging the products of combustion through the checkerwork into the hot zone of higher temperature, an impervious muffle providing a chamber externally of the hot zone of lower temperature, nozzles extending through the tunnel wall and muffle chamber into the interior of the hot zone of lower temperature through which air is supplied in controlled quantities to said hot zone of lower temperature, and circulating means having an induction side and a discharge side, said induction side being connected to the interior of the intermediate zone to induce air from the low temperature hot zone and products of combustion from the high temperature hot zone to flow into the intermediate zone, and means connecting the discharge side of the circulating means to the muffle chamber to deliver the mixed atmospheres from the intermediate zone to the muffle chamber to heat the tunnel wall and, by radiation and muffle convection, to heat the interior of the hot zone of low temperature.

11. Apparatus according to claim 6, wherein there are draft-inducing means disposed at opposite sides of the kiln for exhausting the atmosphere from the intermediate zone symmetrically with respect to the longitudinal axis of the kiln.

12. Apparatus according to claim 6, wherein there are draft-inducing means at opposite sides of the kiln for exhausting the mixed gases from the intermediate zone and mixing chambers situated between the intermediate zone and the draft-inducing means through which the mixed gases flow prior to entering the draft-inducing means.

13. Apparatus according to claim 6, wherein there are draft-inducing means at opposite sides of the kiln for exhausting the mixed gases from the intermediate zone, mixing chambers situated between the intermediate zone and the intake side of the draft-inducing means and dampers associated with the mixing chambers to control the flow therethrough to the draft-inducing means.

14. In an apparatus according to claim 2, including ware-moving means wherein the ware is moved through the kiln in a direction such as to pass through the zone of lower soaking temperature before entering the zone of higher heat treating temperature, a length of said tunnel forming a rapid cooling zone at the discharge end of the zone of higher heat treating temperature, means for supplying cooling air directly to the interior thereof for contact with the ware therein, and means for by-passing some of the air injected into the rapid cooling zone and heated by contact with the hot ware for mixing with the atmosphere exhausted from the intermediate zone.

15. In an apparatus according to claim 2, including ware-moving means wherein the ware is moved through the kiln in a direction such as to pass through the zone of lower soaking temperature before entering the zone of higher heat treating temperature, mixing chambers interposed between the intermediate zone and the draft-inducing means, a length of said tunnel forming a rapid cooling zone at the discharge end of the zone of higher heat treating temperature, means for supplying cooling air directly to the interior of the rapid cooling zone adjacent the discharge end of the zone of higher heat treating temperature for contact with the ware therein, and means for by-passing some of the air injected against the hot ware into the mixing chambers.

16. In an apparatus according to claim 2, including ware-moving means wherein the ware is moved through the kiln in a direction such as to pass through the zone of lower soaking temperature before entering the zone of higher heat treating temperature, mixing chambers interposed between the intermediate zone and the draft-inducing means, a length of said tunnel forming a rapid cooling zone adjacent the discharge end of the zone of higher heat treating temperature containing openings adjacet the discharge end of the zone of higher heat treating temperature, a pump for blowing air through the openings into direct contact with the hot ware within the rapid cooling zone, passages for by-passing part of the air injected into the rapid cooling zone into the mixing chambers, and chambers in the walls of the rapid cooling zone of the kiln through which air is circulated to cool the walls.

17. In an apparatus according to claim 7, a length of said tunnel forming a preheating zone communicating with the zone of lower soaking temperature, said preheat zone provided with an inner wall containing openings through which the atmosphere channeled through the muffle chamber is discharged at a relatively high velocity into the interior of the kiln within the preheating zone, and an exhaust fan in operative communication with the interior of the kiln for effecting movement of the atmosphere entering the preheating zone away from the zone of lower soaking temperature and out of the kiln.

References Cited in the file of this patent
UNITED STATES PATENTS

| | | |
|---|---|---|
| 1,509,195 | Dressler | Sept. 23, 1924 |
| 2,088,554 | Robson et al. | July 27, 1937 |
| 2,567,556 | Dressler et al. | Sept. 11, 1951 |
| 3,050,811 | De Bartolomeis | Aug. 28, 1962 |